United States Patent [19]

Chevalier et al.

[11] Patent Number: 5,677,694
[45] Date of Patent: Oct. 14, 1997

[54] INTERROGATOR ASSEMBLY FOR SYSTEM OF IDENTIFICATION BY RADIO-DETECTION

[75] Inventors: Jean-Pierre Chevalier, Nogent le Roi; Patrick Quemin, Jouy le Moutier, both of France

[73] Assignee: Thomson-CSF, Paris, France

[21] Appl. No.: 597,111

[22] Filed: Feb. 6, 1996

[30] Foreign Application Priority Data

Feb. 14, 1995 [FR] France .................... 95 01658

[51] Int. Cl.⁶ .................................. G01S 13/78
[52] U.S. Cl. ......................................... 342/45
[58] Field of Search ................... 342/45, 40, 37, 342/42, 43, 44

[56] References Cited

U.S. PATENT DOCUMENTS

| | | | |
|---|---|---|---|
| 4,564,840 | 1/1986 | Brisse et al. | 342/47 |
| 5,072,224 | 12/1991 | Verbeke et al. | 342/37 |
| 5,218,365 | 6/1993 | Woodall | 342/40 |
| 5,311,184 | 5/1994 | Kuntman | 342/26 |

FOREIGN PATENT DOCUMENTS

WO92/00531  1/1992  WIPO.

*Primary Examiner*—Daniel T. Pihulic
*Attorney, Agent, or Firm*—Oblon, Spivak, McClelland, Maier & Neustadt, P.C.

[57] ABSTRACT

The disclosure relates to the recognition of an objective known as an IFF or "Identification Friend or Foe" system. In the interrogator unit of the IFF system, the signals received undergo processing operations that take account of the characteristics of the antenna and enable the useful information to be separated from the disturbances. In order to be able to use an electronic scanning antenna in spite of the fact that it has characteristics which vary with the training angle, hence with the direction in which the objective is located, the processing operations to be performed are designed for different training angles, the characteristics of these processing operations are memorized and the processing operations are performed as a function of the training angle.

6 Claims, 3 Drawing Sheets

5,677,694

INTERROGATOR ASSEMBLY FOR SYSTEM OF IDENTIFICATION BY RADIO-DETECTION

BACKGROUND OF THE INVENTION

The present invention relates to the field of the recognition of an objective by means of a system of identification by radio-detection also known as an IFF or "Identification Friend or Foe" system. In the following description and in the claims, the acronym IFF shall be used without returning to the question of its meaning.

There is a known method in which, after an objective has been identified by means of a first system, generally a radar, a signal formed by at least one pair of pulses is sent to this objective, the time lag between these pulses corresponding to a question addressed to the objective, relating for example to its identity. If the objective is fitted out with an appropriate device, it responds by sending a message consisting of evenly distributed zeroes and ones, transmitted in the form of pulses with two sandwiching pulses and one central pulse.

There is a known way of making the interrogator assembly by using a directional mechanical antenna but the signals due in particular to the side lobes of the antenna or to multiple reflections disturb the reception of the useful response signal. To counteract the different disturbances, measures have been proposed. These include, for example, listening to possible responses for a limited time called a "response window" that is related to the listening range, eliminating disturbance signals by GTC and/or RSLS processing etc.

In GTC or gain time control processing, the sensitivity of the receiver is adapted to the distance of the objective so as to reduce the detrimental effects of unnecessarily high sensitivity. For this purpose, the gain of the receiver is reduced at the start of the response window. That is, it is reduced for distances from objectives that are smaller than the maximum range and, in general, the maximum reduction in gain is applied for distances of 3 to 5 km corresponding to the first 20 to 33 microseconds of a response window. Then, the sensitivity is gradually increased as a function of distance until the maximum sensitivity is reached at distances corresponding to 25% to 100% of the maximum range.

RSLS or reception side lobe suppression consists in comparing the amplitude of the signals of the sum $\Sigma$ and difference $\Delta$ channels given by two identical receivers but respectively associated with a directional antenna and an omnidirectional antenna. A signal of the $\Sigma$ channel is taken into account only if the value of its amplitude is at least equal to the sum of the value of the amplitude of the corresponding channel in $\Delta$ channel and a predetermined value.

GTC and RSLS processing operations, as implemented with mechanical scanning antennas, are satisfactory but cannot be implemented with electronic scanning antennas because they require that the antenna patterns should remain constant irrespective of the training angle of the antenna. Now this is not the case with electronic scanning antennas. All the same, it is highly desirable to be able to use electronic scanning antennas as these antennas are fixed and compact, and to be able to adapt GTC and RSLS processing operations accordingly.

SUMMARY OF THE INVENTION

The present invention is aimed at proposing interrogator assemblies fitted out with electronic scanning antennas, to which there are applied GTC and/or RSLS type processing operations specially designed for antennas of this type.

This is obtained especially by matching the processing operation considered to the training of the antenna.

According to the present invention, there is provided an interrogator assembly for a system of identification by radio-detection with, at reception, a device to pick up radiofrequency waves, this device being capable of being trained at different training angles, being designed to give a signal which shall be called a $\Sigma$ channel signal and comprising an electronic scanning antenna, a pulse discrimination circuit of the gain time control type comprising comparison means having a first input coupled to the device, a second input and an output, and a generator of signals to give a reference signal with a time-variable amplitude to the second input of the comparison means, the generator comprising means for the memorizing of several curves of variation of the reference signal as a function of time so that the generator can give, as the reference signal, a signal corresponding, by choice, to one of the curves and means for the selection of one of the curves as a function of the training angle of the device.

According to the invention, there is further provided an interrogator assembly for a system of identification by radio-detection with, at reception, a device to pick up radiofrequency waves, this device being capable of being trained at different training angles and being designed to give two distinct signals that shall be called $\Sigma$ channel and $\Delta$ channel signals and comprising an electronic scanning antenna, and a side lobe suppression circuit comprising a level generator to provide a signal of a given level and means of comparison to receive the $\Sigma$ channel and $\Delta$ channel signals and the signal of a given level and to deliver an output signal if and only if the amplitude of the signal of the $\Sigma$ channel is at least equal to that of the signal of the $\Delta$ channel increased by the amplitude of the signal of a given level, the generator comprising means for the memorizing of several values so that the generator can provide, as the signal of a given level, a signal corresponding, by choice, to one of the values which have been memorized, and means for the selection of one of the values which have been memorized as a function of the training angle of the device.

According to the invention, there is further provided an interrogator assembly for a system of identification by radio-detection with, at reception, a device to pick up radiofrequency waves, this device being capable of being trained at different training angles and being designed to give two distinct signals which shall be called $\Sigma$ channel and $\Delta$ channel signals, a pulse discrimination circuit of the gain time control type, comprising first comparison means having a first input coupled to the device, a second input and an output and a generator of signals to give a reference signal, whose amplitude is variable with time, to the second input of the first comparison means and a side lobe suppression circuit comprising a level generator to give a signal of a given level and second comparison means to receive the $\Sigma$ channel and $\Delta$ channel signals and the signal of a given level and deliver an output signal if and only if the amplitude of the signal of the $\Sigma$ channel is at least equal to that of the signal of the $\Delta$ channel increased by the amplitude of the signal of a given level, the generator of signals comprising means for the memorizing of several curves of variation of the reference signal as a function of time, so as to be capable of giving, as the reference signal, a signal corresponding, by choice, to one of the curves and means for the selection of one of the curves as a function of the training angle of the device and the level generator comprising means for the memorizing of several values so as to be capable of giving, as the signal of a given level, a signal corresponding, by choice, to one of the values which have been memorized and means for the selection of one of the values which have been memorized as a function of the training angle of the device.

BRIEF DESCRIPTION OF THE DRAWINGS

The present invention shall be understood more clearly and other characteristics shall appear from the following description and from the figures appended thereto, of which.

In the different figures, the corresponding elements are designated by the same symbols.

MORE DETAILED DESCRIPTION

Figure 1:
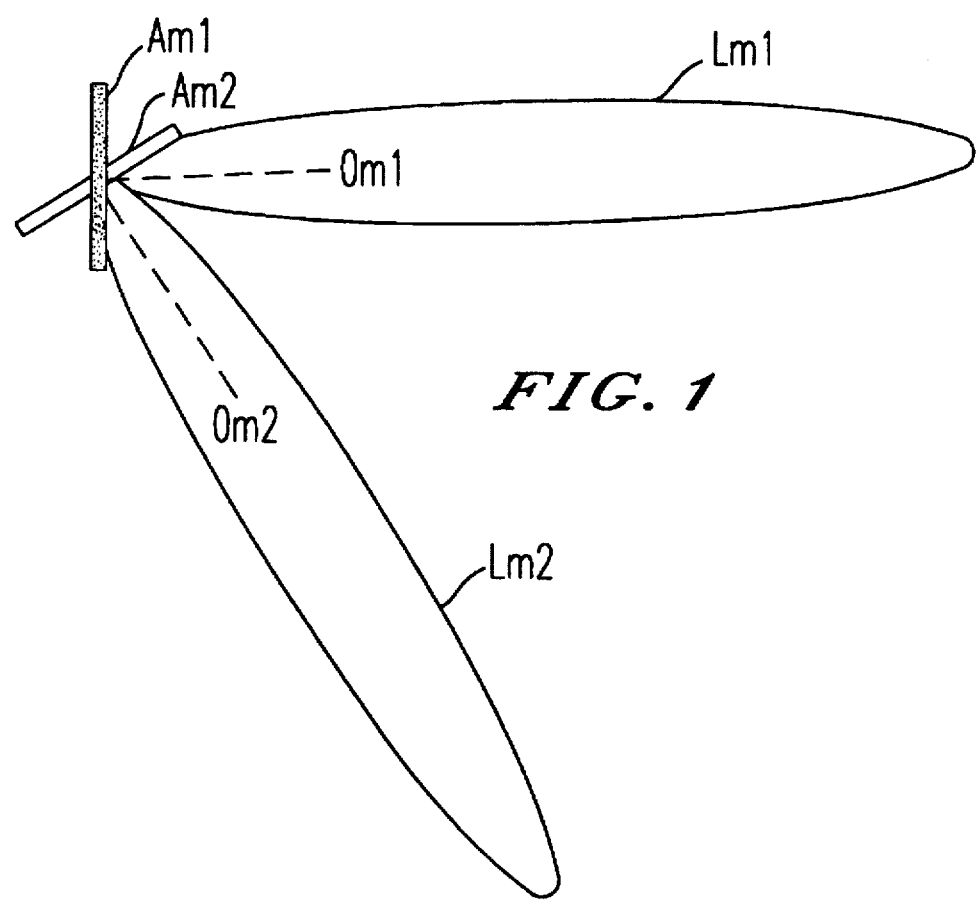
FIG. 1 shows a mechanical scanning antenna.

FIG. 1 shows a directional mechanical scanning antenna in two different training positions: a position Am1 corresponding to a training angle θm1 and a major lobe Lm1 and a position Am2 corresponding to a training angle θm2 and a major lobe Lm2. An antenna of this kind has identical characteristics irrespective of the training angle, as can be seen especially from the depiction of the lobes Lm1 and Lm2.

Figure 2:
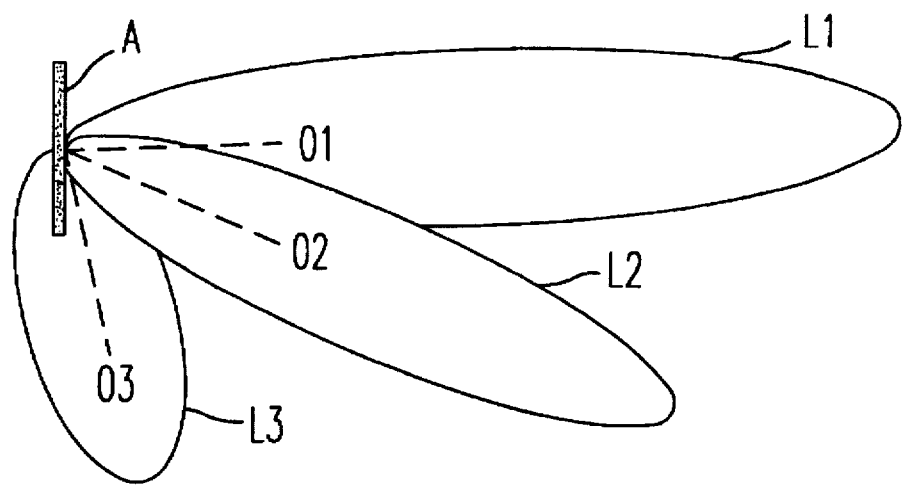
FIG. 2 shows an electronic scanning antenna.

FIG. 2 shows a switched-element antenna A used in electronic scanning. In this figure, the major lobe corresponding to the Σ channel obtained by means of the antenna A has been shown for three different training angles: lobes L1, L2, L3 corresponding respectively to training angles θ1, θ2, θ3. As can be seen from the depiction of the lobes L1, L2, L3, the antenna A has characteristics that are a function of the training angle. This is valid also as regards the entire radiation pattern corresponding to the Σ channel and the entire radiation pattern corresponding to the Δ channel. It may be recalled that the Σ and Δ patterns are obtained simultaneously from one and the same electronic switched-element antenna by combinations of signals given by the constituent radiating elements of the antenna.

To take account of this variation of the characteristics of the antenna, it is proposed to carry out GTC and/or RSLS processing operations that are specific for each value or, at least, for several groups of values of the training angle.

Figure 3:
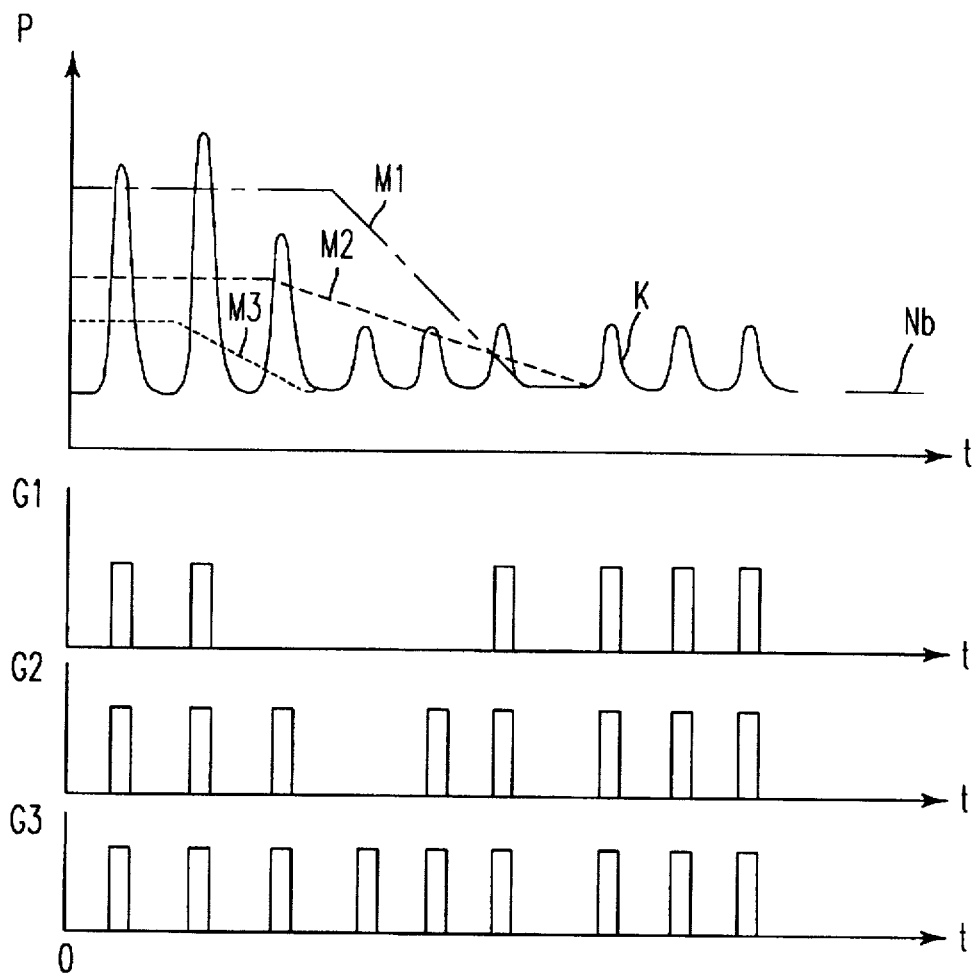
FIGS. 3 and 5 show graphs pertaining to signal processing operations according to the invention.
Figure 4:
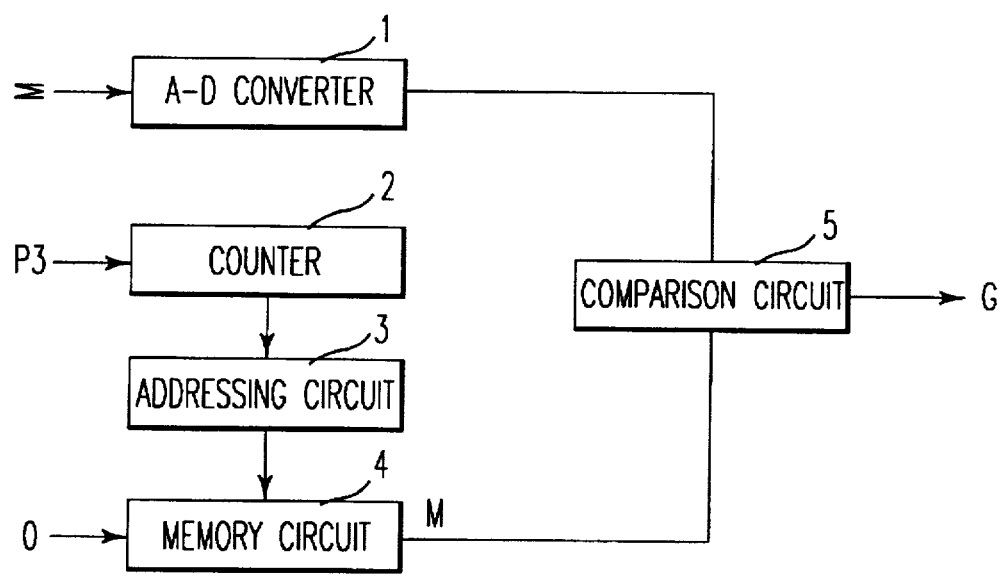
FIGS. 4 and 6 show signal processing circuits according to the invention.

FIGS. 3 and 4 show a way of carrying out a GTC processing operation in an IFF interrogator assembly using an electronic switched-element antenna to carry out an electronic scanning operation.

FIG. 3 is a set of four time-related graphs. In the top graph, an unbroken line shows the development of the power P of a signal K, that appears on the Σ channel, associated with the switching antenna A of FIG. 2. In order to simplify the drawing, it is assumed that the signal K received on the Σ channel has the same shape for each of the three training angles θ1, θ2, θ3 according to FIG. 2. It is therefore drawn only once.

The GTC processing of the signal K consists, as with a mechanical scanning antenna, in determining a threshold curve as a function of the time that has elapsed in the search window and in taking account of only those portions of the signal K whose amplitude is greater than this curve. In the example described, the starting point of the search window, corresponding to the time t=0 in FIG. 3, is determined by the rear edge of the last pulse of the interrogation signal. However, several threshold curves are determined here, each for a different training angle of the electronic scanning antenna: these are the curves M1, M2, M3 respectively for the angles θ1, θ2, θ3 as indicated in FIG. 2.

The threshold curves M1, M2, M3 are determined in the same way as for a mechanical scanning antenna, namely the sensitivity of the receiver is adapted to the distance of the objective so as to achieve a high reduction, by a constant value, in the gain of the receiver at the start of the response window for a duration generally corresponding to responses from objectives located at distances in the range of 3 to 5 km. Then the sensitivity is gradually increased as a function of the distance until the maximum sensitivity is reached at distances corresponding to 25 to 100% of the maximum range. This maximum sensitivity corresponds to the maximum level Nb of noise in the receiver.

Depending on these three threshold curves, the GTC processing of the signal K according to FIG. 3 does not bring out the same quantity of valid information. This is normal because it must not be forgotten that, to simplify the drawing, one and only one form of a signal K has been shown but in fact it must be assumed that the signal K is successively one of the three signals received respectively with training angles θ1, θ2, θ3 and that these three signals are distinct in time, coming from different directions and are therefore totally distinct from one another.

The information elements considered to be valid by the GTC processing operation are shown in the three lower graphs of FIG. 3. These are the graphs G1, G2, G3 respectively for the training angles θ1, θ2, θ3 according to FIG. 2. Naturally, the temporal axis of each of the graphs G1, G2, G3 corresponds, in a vertical translation, to the temporal axis of the graph on which the signal K is shown. This makes it possible to note especially that the third pulse of the graphs G2, G3 does not have any corresponding pulse in the graph G1 for, at this instant, the signal K increases in power to go above the threshold curves M2 and M3 without however attaining the threshold curve M2.

The diagram of an exemplary embodiment of a GTC type pulse discrimination circuit is given in FIG. 4. In this diagram as also in that of FIG. 6, the precise synchronization devices pertaining to current technology have not been shown so as to make the drawings clearer and so as to simplify the explanation.

After threshold curves such as the curves M1, M2, M3 of FIG. 3 have been determined for different training angles, their values are stored in a memory circuit 4.

When an interrogation signal is emitted by the interrogator assembly comprising the circuit according to FIG. 4, the end of this interrogation signal, referenced by the rear edge of a pulse generally called P3 in the technical literature, determines the start of a search window by activating a counter 2 whose counting duration is equal to the duration of the search window. At the same time as the counter 2 is activated, a signal of the same type as the signal K of FIG. 3 appears on the Σ channel of the receiver of the interrogator assembly. It is in this signal that a search will be made for the response to the interrogation signal that has been sent out, i.e. it is in this signal that a search will be made for the information elements that are valid according to the criteria of a GTC processing operation. To this end, the signal of the Σ channel is converted into digital values. These digital values are compared, in a comparison circuit 5, with the digital values of that curve of the threshold curve which corresponds to the training angle of the antenna, at the time of interrogation for which a response is awaited. The selection, from among the memories of the circuit 4, of the memory corresponding to the training angle θ of the antenna is done by a signal representing the value θ applied to a selection input of the circuit 4. The memory selected is read by an addressing circuit 3 whose progress is set by the counter 2.

Thus made, the pulse discrimination circuit according to FIG. 4 gives pulses G of the type shown in the graphs G1, G2 and G3 of FIG. 3 to the output of the comparison circuit 5.

Figure 5:
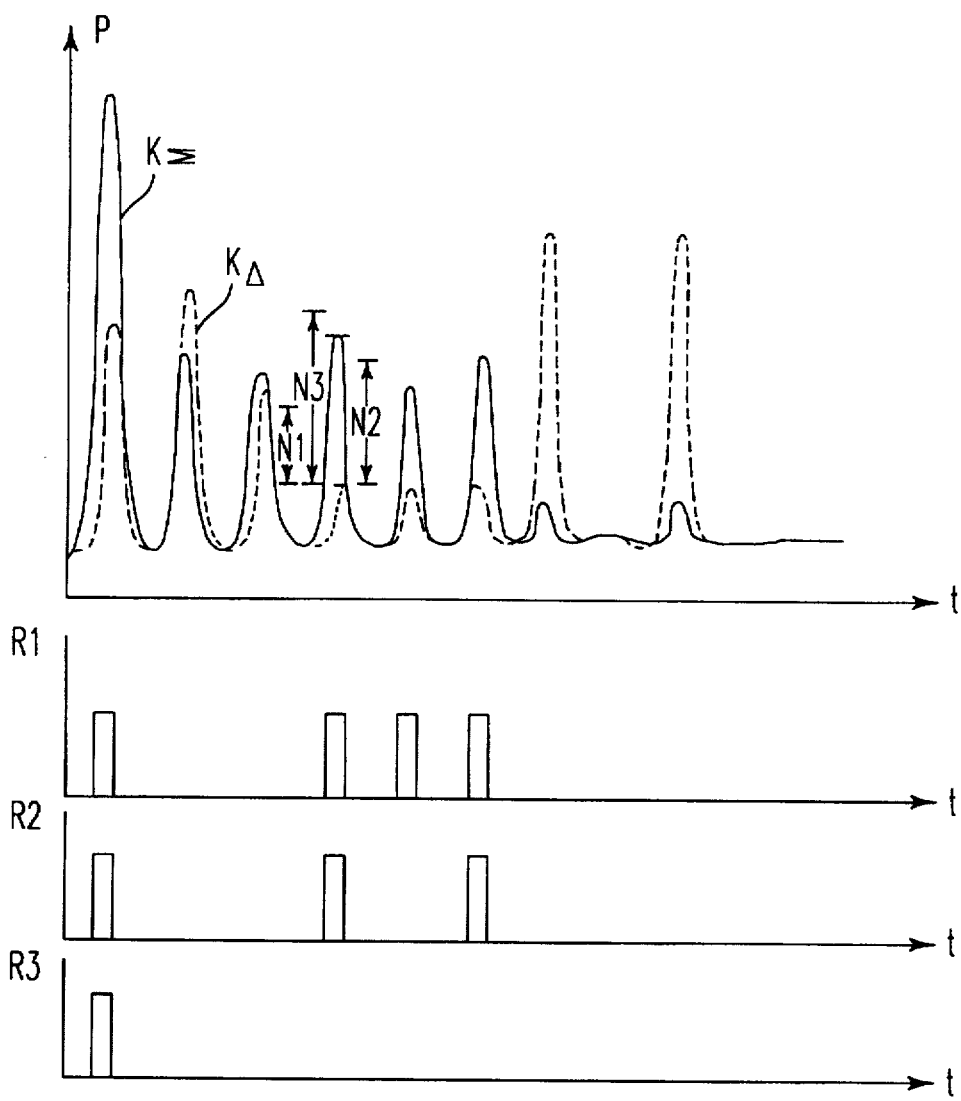
Figure 6:
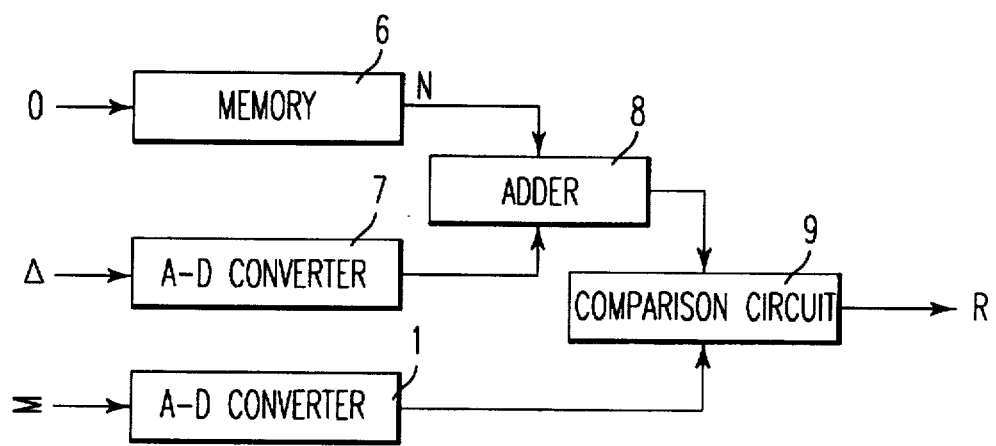

FIGS. 5 and 6 show a way of carrying out an RSLS processing operation in an IFF interrogator assembly using an electronic switching antenna to perform an electronic scanning operation.

FIG. 4 is a set of four time-related graphs. In the top graph, an unbroken line shows the development of the power P of a signal KΣ, that appears on the Σ channel, associated with the switching antenna A of FIG. 2. As in FIG. 3, to simplify the drawing, the signal K that is received on the Σ channel is supposed to have the same shape for each of the three training angles θ1, θ2, θ3 according to FIG. 2. It is therefore drawn only once. The upper graph also shows, in dashes, the development of the power P of a signal K Δ that appears on the Δ channel associated with the antenna A at the same time as the time as the signal K Σ appears on the Σ channel. Here again, a single signal is drawn and will be considered successively as having been obtained with the training angles θ1, θ2, θ3 according to FIG. 2.

The RSLS processing of the signals KΣ and KΔ consist, as with a mechanical scanning antenna, in determining a level of comparison and taking account, in the search window, of only the portions of the signal KΣ whose amplitude is greater than the corresponding portions of the signal KΔ increased by the value of the comparison level. However, in this case, a level of comparison is determined for each training angle: levels N1, N2, N3 respectively for the angles θ1, θ2, θ3. The result thereof is that, for one and the same shape of signals KΣ and KΔ, as assumed in the top graph of FIG. 5, depending on the training angle considered, there will be a greater or smaller number of portions of the signal KΣ that will be taken into account as carriers of valid information. Thus, with the levels N1, N2, N3 as indicated in FIG. 5, the fourth peak of the signal KΣ will be taken into account only for the training angles θ1 and θ2. This is illustrated by the three lower graphs R of FIG. 5 which show the information elements considered as valid by the RSLS processing operation: graphs R1, R2, R3 respectively for the training angles θ1, θ2, θ3 according to FIG. 2. Naturally, the temporal axis of each of the graphs R1, R2, R3 corresponds, in a vertical translation, to the temporal axis of the graph on which the signals KΣ and KΔ are shown. This makes it possible, especially, to note that the second pulse of the graphs R1, R2 has no corresponding pulse in the graph R3 for, at this instant, the signals KΣ and KΔ go through maximum levels for which the difference in levels is greater than N1 and N2 but smaller than N3.

The diagram of an exemplary embodiment of a circuit for the elimination of the side lobes is given in FIG. 6.

After the levels of comparison such as the levels N1, N2, N3 have been determined for different training angles, their values are stored in a memory 6.

The analog signals from the Σ and Δ channels, given by the receiver of the interrogator assembly, are converted into digital form by analog-digital converters 1, 7. The outputs of the memory 6 and of the converter 7 are respectively connected to the two inputs of an adder 8 whose output is connected to the first input of a comparison circuit 9. At its second input, the comparison circuit 9 receives the output signal from the converter 1. At its output, this comparison circuit 9 delivers pulses obtained by the RSLS processing. Thus made, the side lobe suppression circuit according to FIG. 6 works by the selection, in the memory 6, of the comparison level N corresponding to the training angle θ of the antenna and by comparison between the level of the signal on the Σ channel with the sum of the level of the signal on the Δ channel and the level N selected. A pulse R is given by the comparison circuit 9 only if the value of the digital signal at its input connected to the adder 8 is lower than the value of the digital signal at its other input.

The present invention is not limited to the examples described. Thus, for example, the processing circuits of the FIGS. 4 and 6 may be designed with analog comparison circuits. In the case of FIG. 4, the circuit 5 will receive the signal from the Σ channel directly at its first input and will receive the signal from the memory circuit 4 through a digital-analog converter. In the case of FIG. 6, the circuit 9 will receive the signal from the Σ channel directly and either the adder 8 will be followed by a digital-analog converter or the adder 8 will be an analog adder, the converter 7 will be replaced by a short circuit, and a digital-analog converter will be inserted between the memory 6 and the adder 8. Similarly, in the side lobe suppression circuit, the comparison, instead of being done by comparison of the signal of the Σ channel with the signal of the Δ channel increased by a given level, may be done by comparison of the signal of the Δ channel with the signal of the Σ channel minus this same given level.

Furthermore, it must be noted that an IFF interrogator assembly according to the invention may be equipped either with a GTC type of processing circuit or a side lobe suppression circuit, or with both of these circuits. In the latter case, a pulse could be considered as representing information provided that it appears simultaneously at the output of these two circuits and, in the case of FIGS. 4 and 6, the analog-digital converter 1 could be common to the two circuits. This is why it bears the same reference in the two figures.

What is claimed is:

1. An interrogator subassembly of a radio-based identification system, comprising:

an electronic scanning antenna for receiving radio frequency waves in plural steering angles and for providing a Σ channel signal and a Δ channel signal for each steering angle;

side lobe suppression means for comparing the Σ channel signal to the sum of the Δ channel signal and a predetermined level signal and outputting a corresponding output signal, comprising, level generating means for storing plural predetermined level signals corresponding to the plural steering angles and for providing at each given moment the predetermined level signal corresponding to the one of said plural steering angles at said given moment, and comparing means for comparing the Σ channel signal with the sum, and for outputting the corresponding output signal indicative of a comparison result if and only if an amplitude of the Σ channel signal equals or exceeds that of the sum.

2. An interrogator subassembly of a radio-based identification system, comprising:

an electronic scanning antenna for receiving radio frequency waves in plural steering angles and for providing a Σ channel signal for and a Δ channel signal for of said plural steering angles;

a variable gain time control pulse discrimination circuit for comparing the Σ channel signal to a reference signal having a time varying amplitude and for outputting a corresponding first output signal, comprising, a first comparing circuit for comparing the Σ channel signal with the reference signal and providing the first output signal indicative of a comparison result, and a signal generator for providing the reference signal having a time-varying amplitude to the first comparing circuit, said signal generator comprising, a memory for storing plural predetermined time-varying curves corresponding to respective of the plural steering angles, and first selecting means for selecting at each given moment as said reference signal the one of the plural predetermined time-varying curves corresponding to the one of said plural steering angles at said given moment; and a side lobe suppression circuit comprising, a level generator for providing a comparison level signal, said level generator comprising storing means for storing plural predetermined level signals corresponding to the plural steering angles and second selecting means for selecting at each given moment the predetermined level signal corresponding to one of said plural steering angles at said given moment, and a second comparing circuit comprising, a first input terminal for receiving the Σ channel signal, a second input terminal for receiving the Δ channel signal from the electronic scanning antenna, a third input terminal for receiving the predetermined level signal, and an output terminal for outputting a second output signal if and only if the amplitude of the Σ channel signal equals or exceeds that of the sum of the Δ channel and the predetermined level signal.

3. An interrogator subassembly of a radio-based identification system, comprising:

an electronic scanning antenna for receiving radio frequency waves in plural steering angles and for providing a Σ channel signal and a Δ channel signal for each of said plural steering angles;

variable gain time control pulse discriminating means for comparing the Σ channel signal to a predetermined reference signal having a time-variable amplitude and for outputting a corresponding first output signal, comprising, first comparing means for comparing the Σ channel signal with the predetermined reference signal and providing the first output signal indicative of a comparison result, signal generating means for providing the predetermined reference signal having a time-variable amplitude to the first comparing means, said signal generating means comprising, a memory for storing plural predetermined time-varying curves corresponding to respective of said plural steering angles, and selecting means for selecting at each given moment as said reference signal the one of said plural time-varying curves corresponding to the one of said plural steering angles of the antenna at said given moment; and a side lobe suppression circuit comprising, level generating means for storing plural predetermined level signals corresponding to the plural steering angles and for providing at each given moment the predetermined level signal corresponding to the one of said plural steering angles at said given moment, and second comparing means for outputting a second output signal if and only if an amplitude of the Σ channel signal equals or exceeds that of the sum of the Δ channel and of the predetermined level signal provided by the level generating means.

4. An interrogator subassembly of a radio-based identification system, comprising:

an electronic scanning antenna for receiving radio frequency waves in plural steering angles and for providing a Σ signal for each of said plural steering angles;

a variable gain time control pulse discrimination circuit comprising, a comparing circuit comprising, a first input terminal for receiving the Σ signal from the electronic scanning antenna, a second input terminal and an output terminal for outputting an output signal, and a signal generator for providing a predetermined reference signal having a time-varying amplitude to the second input terminal of the comparing circuit, said signal generator comprising, a memory for storing plural predetermined time-varying curves corresponding to respective of the plural steering angles, and selecting means for selecting at each given moment as said reference signal the one of the plural predetermined time-varying curves corresponding to the one of said plural steering angles at said each given moment, wherein said comparing circuit is for comparing the Σ signal to the reference signal and for outputting a comparison result as the output signal.

5. An interrogator subassembly of a radio-based identification system, comprising:

an electronic scanning antenna for receiving radio frequency waves in plural steering angles and for providing a Σ signal for each of said plural steering angles; and variable gain time control pulse discriminating means for comparing the Σ signal to a predetermined reference signal having a time-variable amplitude and for outputting a corresponding output signal, comprising, comparing means for comparing the Σ signal with the predetermined reference signal and providing the output signal which is indicative of a comparison result, signal generating means for providing the predetermined reference signal having a time-variable amplitude to the comparing means, said signal generating means comprising, a memory for storing plural predetermined time-varying curves corresponding to respective of said plural steering angles, and selecting means for selecting at each given moment as said reference signal the one of said plural time-varying curves corresponding to the one of said plural steering angles of the antenna at said given moment.

6. An interrogator subassembly of a radio-based identification system, comprising:

an electronic scanning antenna for receiving radio frequency waves in plural steering angles and for providing a $\Sigma$ channel signal and a $\Delta$ channel signal each corresponding to a selected one of said plural steering angles; and a side lobe suppression circuit comprising, a level generator for providing a predetermined level signal, said level generator having storing means for storing plural predetermined level signals corresponding to the plural steering angles and selecting at each given moment the predetermined level signal corresponding to the one of said plural steering angles at said given moment, and a comparing circuit comprising, a first input terminal for receiving the $\Sigma$ channel signal from the electronic scanning antenna, a second input terminal for receiving the $\Delta$ channel signal from the electronic scanning antenna, a third input terminal for receiving the comparison level signal, and an output terminal for outputting an output signal if and only if the amplitude of the $\Sigma$ channel signal equals or exceeds that of the sum of the $\Delta$ channel signal and the comparison level signal.

* * * * *